United States Patent
Hay et al.

(10) Patent No.: US 10,657,255 B2
(45) Date of Patent: May 19, 2020

(54) DETECTING MALICIOUS CODE BASED ON CONDITIONAL BRANCH ASYMMETRY

(71) Applicant: INTERNATIONAL BUSINESS MACHINES CORPORATION, Armonk, NY (US)

(72) Inventors: Roee Hay, Haifa (IL); Sagi Kedmi, Raanana (IL); Omer Tripp, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 14/973,358

(22) Filed: Dec. 17, 2015

(65) Prior Publication Data

US 2017/0177868 A1    Jun. 22, 2017

(51) Int. Cl.
*G06F 21/56* (2013.01)
*G06F 21/55* (2013.01)

(52) U.S. Cl.
CPC .......... *G06F 21/565* (2013.01); *G06F 21/554* (2013.01)

(58) Field of Classification Search
CPC ...... G06F 21/565; G06F 21/554; G06F 21/56; G06F 21/00; G06F 9/44; G06F 11/36; G06F 21/57; G06F 21/55; G06F 9/45; G06F 11/30; H04N 7/26; G06N 99/00; H04L 29/06; H04L 9/32; H04L 9/00
See application file for complete search history.

(56) References Cited

U.S. PATENT DOCUMENTS

| | | | | |
|---|---|---|---|---|
| 8,914,879 B2* | 12/2014 | Melnik | ............... | H04L 63/0227 726/22 |
| 2002/0184591 A1* | 12/2002 | Chang | ................... | H03M 13/05 714/752 |
| 2003/0177394 A1* | 9/2003 | Dozortsev | ............... | G06F 21/52 713/187 |
| 2005/0015752 A1* | 1/2005 | Alpern | ................ | G06F 11/3604 717/131 |
| 2009/0158260 A1* | 6/2009 | Moon | ................. | G06F 11/3612 717/133 |
| 2010/0208794 A1* | 8/2010 | Ohgose | ................ | H04N 19/176 375/240.02 |
| 2010/0218256 A1* | 8/2010 | Thomas | ................ | G06F 21/552 726/25 |

(Continued)

*Primary Examiner* — Thanhnga B Truong
(74) *Attorney, Agent, or Firm* — Tutunjian & Bitetto, P.C.; Jeffrey S. LaBaw

(57) ABSTRACT

A computer-implemented method for detecting malware based on asymmetry includes receiving, via a processor, an application to be tested. The method includes computing, via the processor, a static call graph for the application. The method also includes generating, via the processor, an interprocedural control-flow graph (ICFG) based on the static call graph. The method further includes detecting, via the processor, symbolic path conditions and executable operations along different paths of conditional branches in the ICFG. The method further includes detecting, via the processor, asymmetries based on the symbolic path conditions and the executable operations. The method includes detecting, via the processor, a malicious block based on the detected asymmetries. The method further includes modifying, via the processor, the application based on the detected malicious block.

20 Claims, 5 Drawing Sheets

(56) References Cited

U.S. PATENT DOCUMENTS

| | | | |
|---|---|---|---|
| 2010/0319070 A1* | 12/2010 | Born | G06F 21/51 |
| | | | 726/23 |
| 2011/0302654 A1* | 12/2011 | Miettinen | G06F 21/552 |
| | | | 726/23 |
| 2011/0317756 A1* | 12/2011 | Fukata | H04N 19/172 |
| | | | 375/240.02 |
| 2014/0351797 A1* | 11/2014 | Kalayci | G06F 11/3696 |
| | | | 717/127 |
| 2016/0224793 A1* | 8/2016 | Lu | G06F 21/577 |
| 2016/0275289 A1* | 9/2016 | Sethumadhavan | G06F 21/552 |
| 2016/0366158 A1* | 12/2016 | Feng | H04L 63/1416 |

* cited by examiner

DETECTING MALICIOUS CODE BASED ON CONDITIONAL BRANCH ASYMMETRY

BACKGROUND

Technical Field

The present invention relates to detecting malicious code in applications. More specifically, the present invention relates to detecting malicious code based on detected conditional branch asymmetry in applications.

SUMMARY

According to an embodiment described herein, a system can include processor to receive an application to be tested. The processor can also further generate an interprocedural control-flow graph (ICFG) based on a static call graph for the application. The processor can also detect symbolic path conditions and executable operations along different paths of conditional branches in the ICFG. The processor can also further detect asymmetries based on the symbolic path conditions and the executable operations. The processor can detect a malicious block based on the detected asymmetries. The processor can also modify the application based on the detected malicious block.

According to another embodiment described herein, a method can include receiving, via a processor, an application to be tested. The method can further include computing, via the processor, a static call graph for the application. The method can also further include generating, via the processor, an interprocedural control-flow graph (ICFG) based on a static call graph for the application. The method can also include detecting, via the processor, symbolic path conditions and executable operations along different paths of conditional branches in the ICFG. The method can further include detecting, via the processor, asymmetries based on the symbolic path conditions and the executable operations. The method can also include detecting, via the processor, a malicious block based on the detected asymmetries. The method can also further include modifying, via the processor, the application based on the detected malicious block.

According to another embodiment described herein, a computer program product for detecting malicious blocks based on detected asymmetries can include computer-readable storage medium having program code embodied therewith. The computer readable storage medium is not a transitory signal per se. The program code executable by a processor to cause the processor to receive an application to be tested. The program code can also cause the processor to compute a static call graph for the application. The program code can also cause the processor to generate an interprocedural control-flow graph (ICFG) based on the static call graph. The program code can also cause the processor to detect symbolic path conditions and executable operations along different paths of conditional branches in the ICFG. The program code can also cause the processor to detect asymmetries based on the symbolic path conditions and the executable operations. The program code can also cause the processor to also further detect one or more error handling operations associated with one or more of the asymmetries. The program code can also cause the processor to detect a malicious block based on the detected asymmetries and the one or more error handling operations. The program code can also cause the processor to modify the application based on the detected malicious block.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
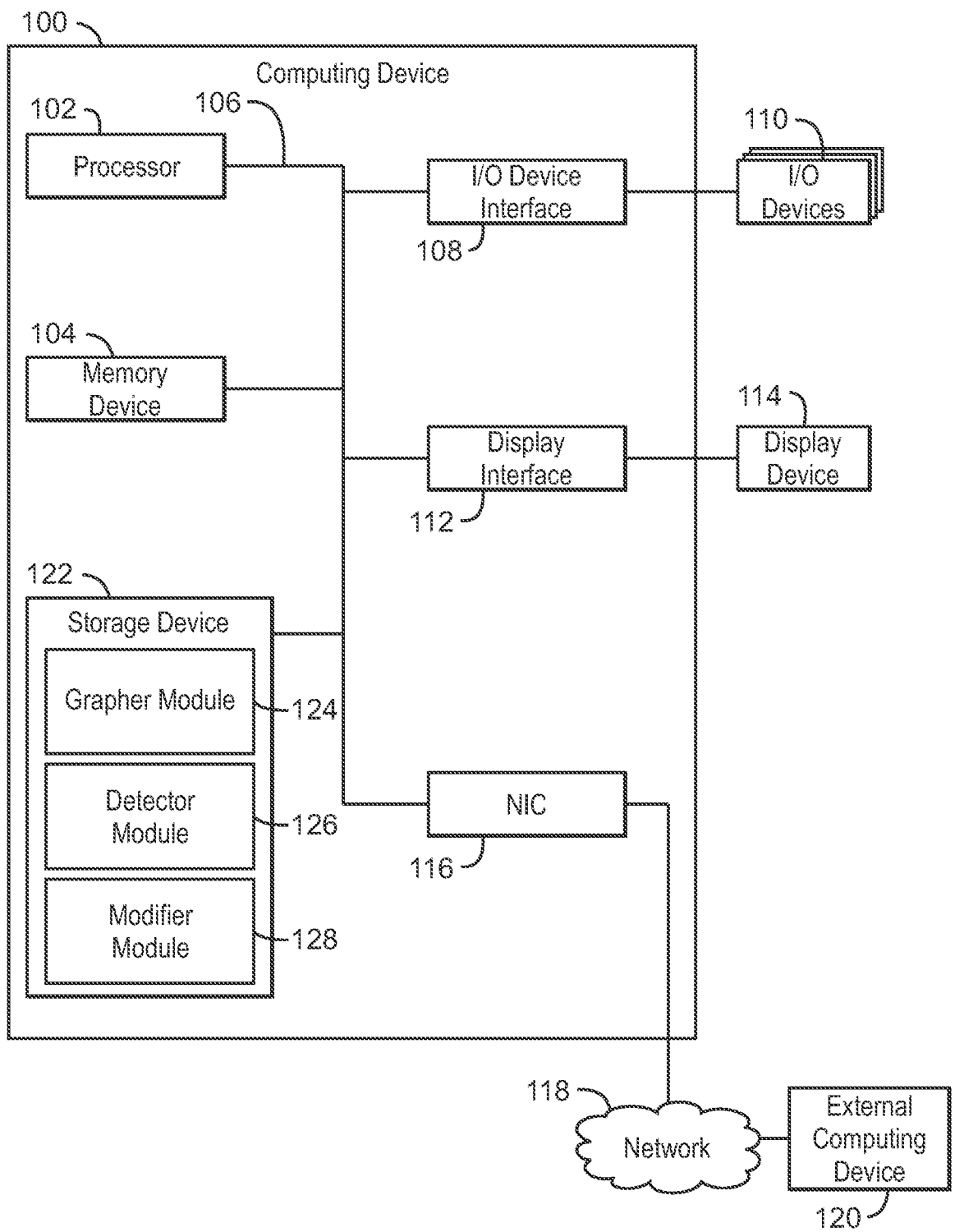
FIG. 1 is a block/flow diagram of an example computing device that can detect malicious blocks based on conditional branch asymmetry.

Malicious software is prevalent. For example, recent statistics indicate that up to five million Android users are affected by malware issues. In some examples, such malware issues may include the stealing of sensitive user information or exploiting software users financially. For example, the malware may send unauthorized SMS messages for which a user is charged a premium price.

Malicious software disguises itself as benign in order to be persistent and resilient to detection and removal. Malicious software may also hide its true functionality if the environment in which the malware is run is inadequate for its needs. For example, the malware may be running on an emulator rather than a physical device, requiring a particular platform version and/or build to carry out the exploit.

However, malicious software often exhibits inherent structural asymmetries. For example, based on a conditional check, one branch in the code of malicious software may proceed to execute a benign behavior, while another branch is responsible for executing the attack. According to embodiments of the present disclosure, a system can detect malicious blocks in a computer program based on detected asymmetries. For example, a static call graph can be computed for the application and an interprocedural control-flow graph (ICFG) can be generated based on the static call graph. The static call graph represents the relationships of function calls between subroutines or functions in a computer program. The asymmetries can then be detected based on detected symbolic path conditions and executable operations along different paths of conditional branches in the ICFG. As used herein, symbolic path conditions refer to relations used to express conditions on all executions following a particular execution path. For example, a symbolic path condition may be an inequality in the form $x<5$. In some examples, the application can be modified based on the detected malicious blocks. For example, the detected malicious blocks can be removed from the application. Thus, embodiments of the present disclosure enable malicious software to be automatically detected and modified into benign software including the branches exhibiting benign behavior.

In some scenarios, the techniques described herein may be implemented in a cloud computing environment. As discussed in more detail below in reference to at least FIGS. 1, 3, and 4, a computing device configured to detect malicious blocks based on conditional branch asymmetry may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example computing device can detect malicious blocks based on conditional branch asymmetry. The computing device 100 may be, for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 configured to execute stored instructions, a memory device 104 to provide temporary memory space for operations of said instructions during operation. The processor 102 can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 configured to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 configured to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be configured to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device 122 may include a grapher module 124, a detector module 126, and a modifier module 128. The grapher module 124 can receive an application to be tested. For example, the application can include a complied application, source code for an application, and the like. The grapher module 124 can generate an interprocedural control-flow graph (ICFG) based on a static call graph for the application. For example, the static call graph can include call relationships of the application. In some embodiments, the static call graph can include each call relationship for each subroutine or function in an application. The detector module 126 may then detect symbolic path conditions and executable operations along different paths of conditional branches in the ICFG. The symbolic path conditions can include relations, such as inequalities, among other relations. The detector module 126 can detect asymmetries based on the symbolic path conditions and the executable operations. The detector module 126 can further detect a malicious block based on the detected asymmetries. The modifier module 128 can modify the application based on the detected malicious block.

In some examples, the detector module 126 can also detect error handling operations and detect the malicious block based on asymmetries that are not associated with the detected error handling operations. For example, asymmetries that are related to conditional branches corresponding to error handling operations may be disregarded when detecting malicious blocks. In some examples, the detector module 126 can generate a list of potential malicious blocks based on the detected asymmetries and remove potential blocks corresponding to the detected error handling operations from the list of potential malicious blocks.

It is to be understood that the block/flow diagram of FIG. 1 is not intended to indicate that the computing device 100 is to include all of the components shown in FIG. 1. Rather, the computing device 100 can include fewer and/or additional components not illustrated in FIG. 1 (e.g., additional memory components, embedded controllers, modules, additional network interfaces, etc.). Furthermore, any of the functionalities of the grapher module 124, the detector module 126, and the modifier module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the grapher module 124, detector module 126, and modifier module 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
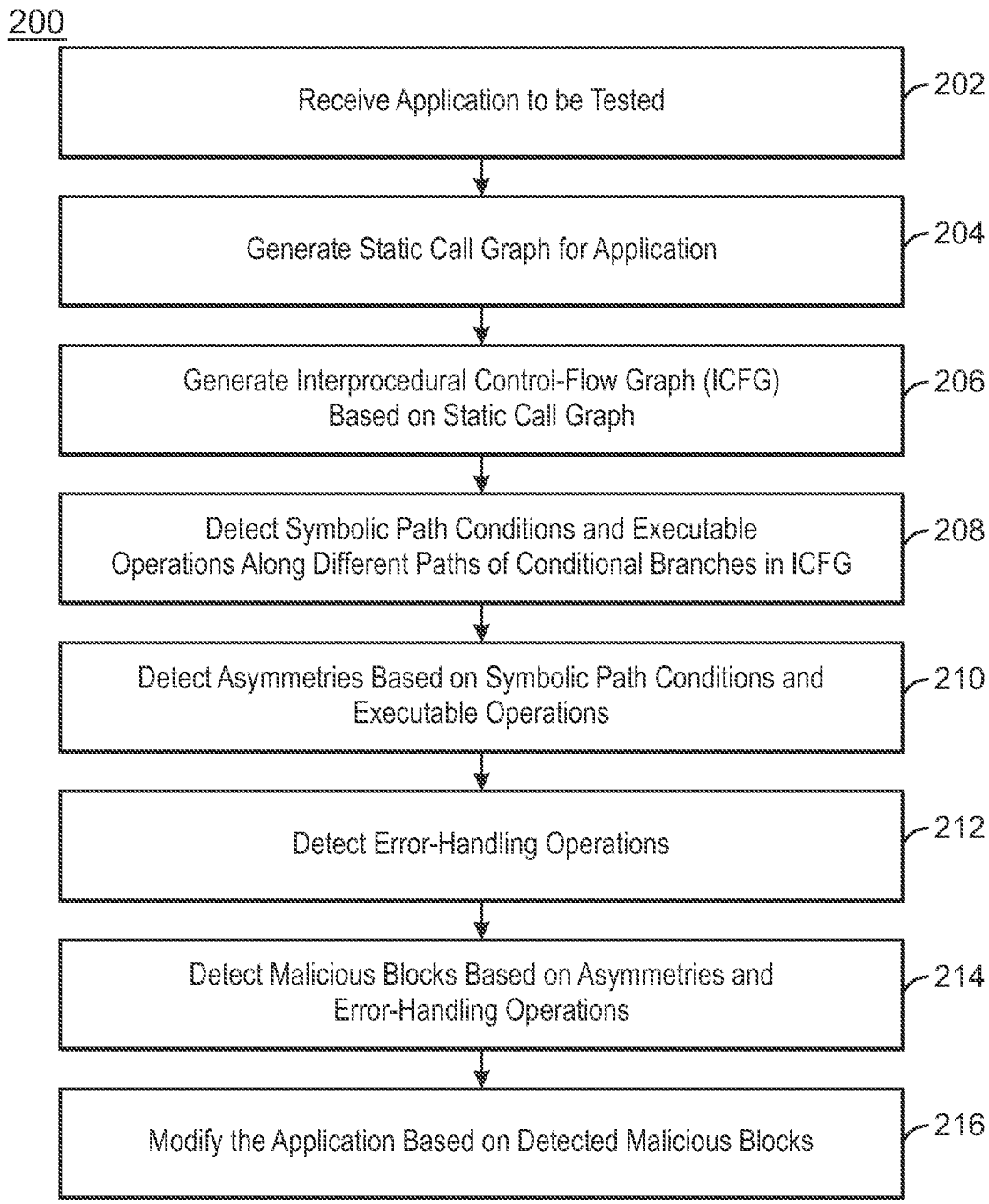
FIG. 2 is a block/flow diagram of an example method that can detect malicious blocks based on conditional branch asymmetry.

FIG. 2 is a process block/flow diagram of an example method that can detect malicious blocks based on conditional branch asymmetry. The method 200 can be implemented with any suitable computing device, such as the computing device 100 of FIG. 1. For example, the method can be implemented via the processor 102 of computing device 100.

At block 202, the processor receives an application to be tested. For example, the application can be a mobile application, or any other suitable type of application. In some examples, the mobile application may have been compiled and the source code may not be available for analysis. The mobile application may contain one or more malware functions. For example, an application may be a flashlight application that may contain malware that sends out premium text messages under certain conditions. The underlying conditional code may check for a platform version and country and thus take the form of:

if (platformVersion>=2.3.3 && simCountry.equals ("US"))
  {
    SMSManager manager=getSMSManager( );
    . . .
    manager.sendTextMessage( . . . );
  }
  doFlashlight( );

At block 204, the processor computes a static call graph for the application. For example, the static call graph can include all possible call relationships of the application. In some examples, the static call graph can be computed by any appropriate algorithm for computing static call graphs.

At block 206, the processor generates an interprocedural control-flow graph (ICFG) based on the static call graph. For example, the ICFG can include all paths that might be traversed through a program during execution.

At block 208, the processor detects symbolic path conditions and executable operations along different paths of conditional branches in the ICFG. For example, each symbolic path condition may be associated with two or more branches forming different paths along the ICFG. The executable operations corresponding to the branches can be detected and analyzed. In some examples, the processor can traverse conditional branching behaviors in the ICFG and extract the bodies of both branches in any detected branches.

At block 210, the processor detects asymmetries based on the symbolic path conditions and the executable operations. For example, the processor can compare between "if" and "else" bodies in the ICFG to detect potential asymmetries. In some examples, the processor can compare an amount of code in the executable operation corresponding to blocks of each branch of a conditional branch. For example, differing amounts of code in each branch of a conditional branch may be detected as an asymmetry. In some examples, the processor can compare a number of security-relevant operations in each branch of a conditional branch. For example, differing number of security-relevant operations in the branches of a conditional branch may be detected as an asymmetry. The detected asymmetries can be displayed via a user interface. In the example conditional code mentioned above in block 202, the processor could detect the two branches:

[platformVersion>=2.3.3 && simCountry.equals("US")]
    getSMSManager( )
    sendTextMessage( )
    doFlashlight( )
and
[platformVersion<2.3.3 || !simCountry.equals("US")]
    doFlashlight( ).

In this example, both the amount of code and the number of operations differ between the two branches. Thus, the processor can detect an asymmetry between these two conditional branches.

At block 212, the processor detects error-handling operations. For example, the processor can detect code invoking standard error-logging functionality, including calls such as standard mobile Log.e( . . . ), Log.w( . . . ), and/or Log.wtf( . . . ) calls. An example error-handling conditional branch is:

```
if (platformVersion >= 2.3.3)
{
        doFunctionality( );
}
else
{
        Log.e("Platform version too low! Quitting.");
}
``` where doFunctionality( ) is the function conditioned on a particular platform version, and Log.e( ) is the error-handling operation to run if the version is below 2.3.3.

At block 214, the processor detects a malicious block based on the detected asymmetries. In some examples, the processor can generate a list of potentially malicious blocks based on the detected asymmetries. The processor can then detect that one or more potentially malicious blocks correspond to an error handling operation. Although the processor can initially detect these conditional branches as asymmetrical, the processor can also detect the Log.e( ) error-handling operation in block 212 above and thus not identify the associated conditional branches and operations as malicious. The processor may thus detect the presence of any error-handling application program interfaces (APIs) and detect malicious blocks at least based on whether error-handling APIs are present or not. In some examples, the processor can remove the potentially malicious blocks corresponding to error handling operations from the list of potentially malicious blocks. Thus, false positives corresponding to error handling functionality can be automatically removed because malware is highly unlikely to include any error-handling functionality. In some examples, detected false positives corresponding to error-handling operations can be displayed for review in a user interface prior to being removed. As one goal of any malware application is to avoid detection, however, malware applications typically silently default to their purported functionality when conditions are not suitable to launch an attack. Therefore, removal of false positives due to error handling can be generally automated.

At block 216, the processor modifies the application based on the detected malicious block. For example, the processor can remove a conditional branch associated with the detected malicious block. In some examples, the processor can remove the malicious block from the application. In some examples, the processor can replace a malicious block with a benign block that provides any suitable functionality.

The process block/flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
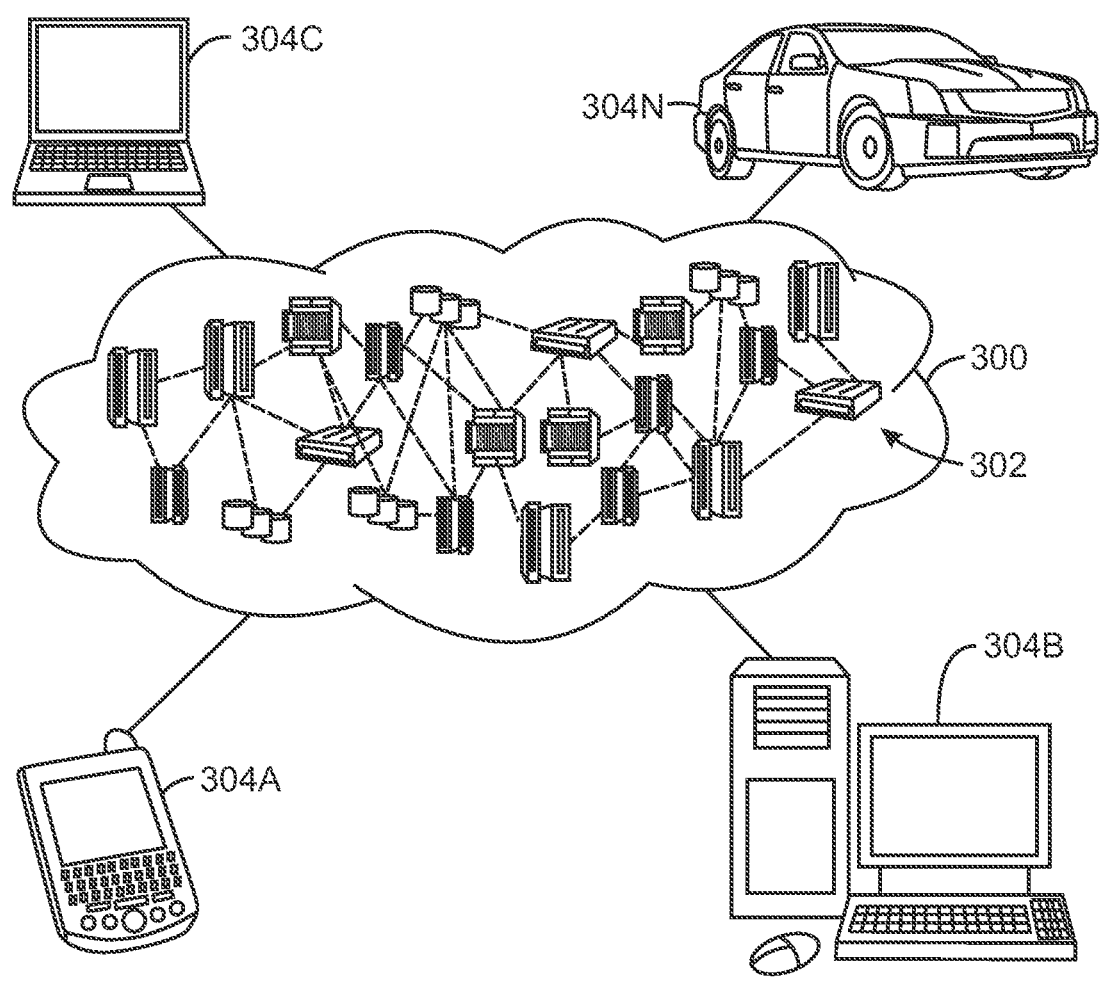
FIG. 3 is a block/flow diagram of an example cloud computing environment according to embodiments described herein.

Referring now to FIG. 3, illustrative cloud computing environment 300 is depicted. As shown, cloud computing environment 300 comprises one or more cloud computing nodes 302 with which local computing devices used by cloud consumers, such as, for example, personal digital assistant (PDA) or cellular telephone 304A, desktop computer 304B, laptop computer 304C, and/or automobile computer system 304N may communicate. Nodes 302 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 304A-N shown in FIG. 3 are intended to be illustrative only and that computing nodes 302 and cloud computing environment 300 can communicate with any type of computerized device over any type of network and/or network addressable connection (e.g., using a web browser).

Figure 4:
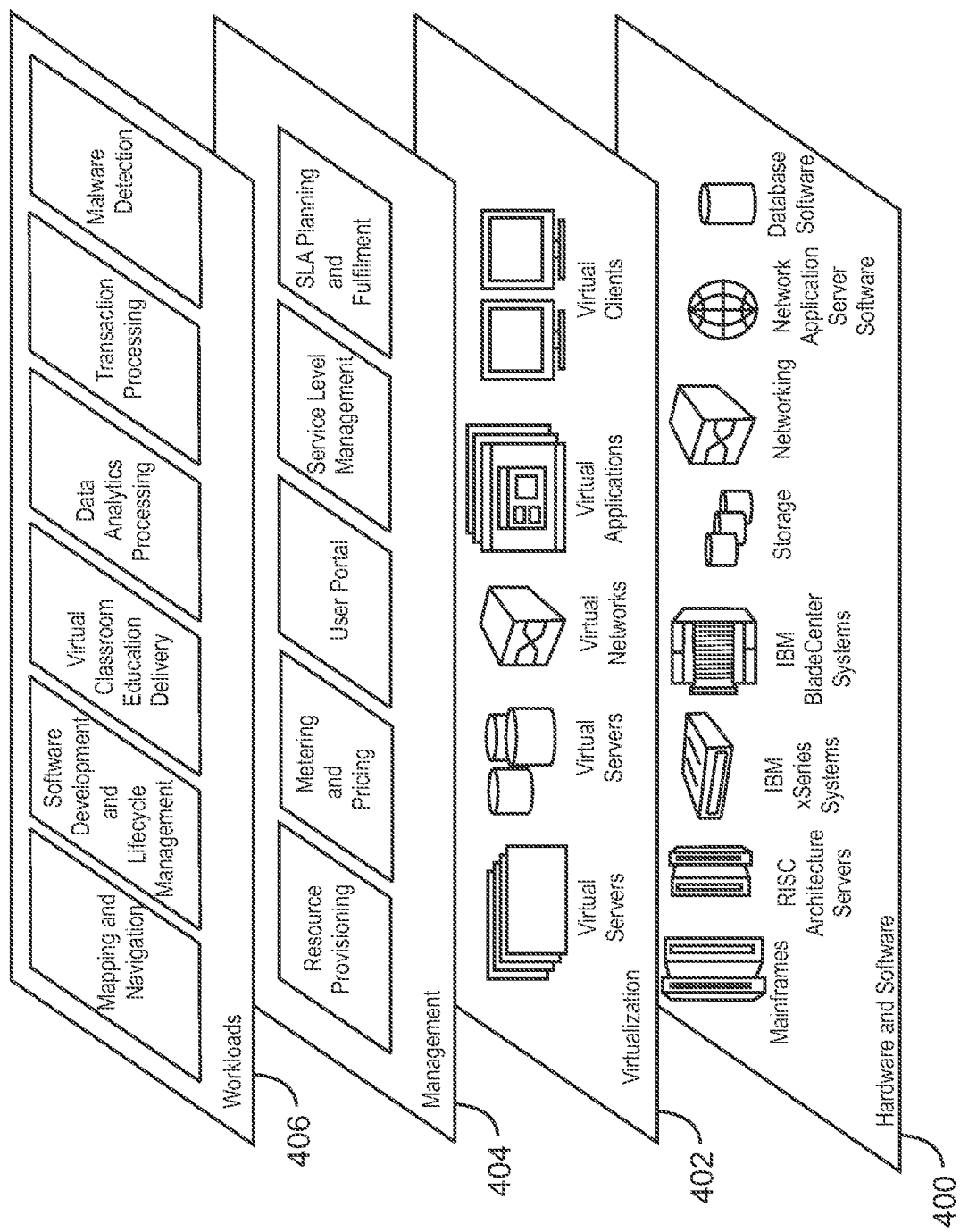
FIG. 4 is an example abstraction model layers according to embodiments described herein.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided.

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 402 provides an abstraction layer from which the following examples of virtual entities may be provided: virtual servers; virtual storage; virtual networks, including virtual private networks; virtual applications and operating systems; and virtual clients. In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and malware detection.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
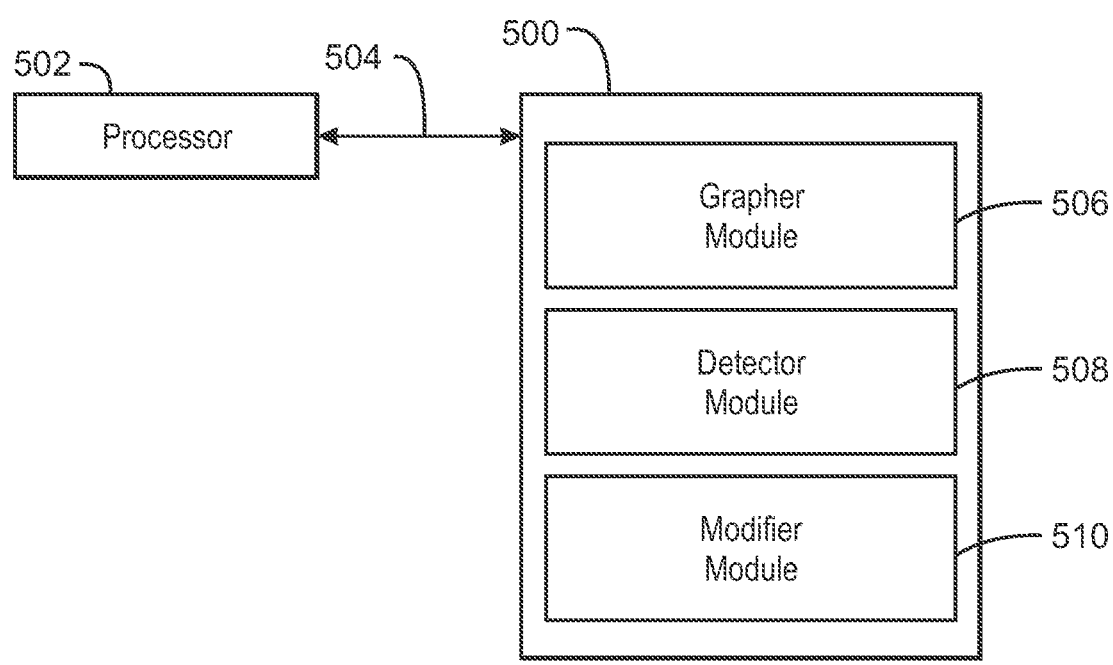
FIG. 5 is an example tangible, non-transitory computer-readable medium that can detect malicious blocks based on detected asymmetries.

Referring now to FIG. 5, a block diagram is depicted of an example tangible, non-transitory computer-readable medium 500 that can detect malicious blocks based on detected asymmetries. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the method 200 of FIG. 2 above.

The various software components discussed herein may be stored on the tangible, non-transitory, computer-readable medium 500, as indicated in FIG. 5. For example, a grapher module 506 includes code to receive an application to be tested. The grapher module 506 also includes code to compute a static call graph for the application. The grapher module 506 further includes code to generate an interprocedural control-flow graph (ICFG) based on the static call graph. A detector module 508 includes code to detect symbolic path conditions and executable operations along different paths of conditional branches in the ICFG. The detector module 508 also includes code to detect asymmetries based on the symbolic path conditions and the executable operations. The detector module 508 further includes code to detect one or more error handling operations associated with one or more of the asymmetries. The detector module 508 also includes code to detect a malicious block based on the detected asymmetries and the one or more error handling operations. In some examples, the detector module 508 includes code to generate a list of potentially malicious blocks and add the potentially malicious block to the list of potentially malicious blocks. In some examples, the detector module 508 includes code to detect an error handling operation and remove a block from the list of potentially malicious blocks corresponding to the detected error handling operation. In some examples, the detector module 508 can include code to compare an amount of code in two blocks corresponding to a symbolic conditional branch. In some examples, the detector module 508 can include code to compare a number of security-relevant operations to be executed under each branch of a symbolic path condition. A modifier module 510 includes code to modify the application based on the detected malicious block. For example, the modifier module 510 can include code to modify the application by removing the malicious block from the application code. It is to be understood that any number of additional software components not shown in FIG. 5 may be included within the tangible, non-transitory, computer-readable medium 500, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for detecting malicious blocks based on detected asymmetric conditional branches, the system comprising:
   a hardware processor device configured to:
      receive an application to be tested;
      generate an interprocedural control-flow graph (ICFG) based on a static call graph for the application;
      detect symbolic path conditions and executable operations along different paths of conditional branches in the ICFG;
      detect asymmetric conditional branches based on the symbolic path conditions and the executable operations, wherein differing amounts of code detected in two or more respective conditional branches indicate an asymmetric conditional branch;
      identify one or more malicious blocks based on the detected asymmetric conditional branches; and
      modify the application based on the one or more detected malicious blocks.

2. The system of claim 1, wherein the hardware processor device is to further configured to:
   detect error handling operations; and
   detect the malicious block based on asymmetric conditional branches that are not associated with the detected error handling operations.

3. The system of claim 1, wherein the hardware processor device is further configured to generate a list of potential malicious blocks based on the detected asymmetric conditional branches and remove potential malicious blocks corresponding to detected error handling operations from the list of potential malicious blocks.

4. The system of claim 1, wherein the symbolic path conditions comprise inequalities.

5. The system of claim 1, wherein the static call graph comprises call relationships of the application.

6. The system of claim 1, wherein the ICFG comprises potential paths of an execution.

7. The system of claim 1, wherein the application comprises a compiled application.

8. A computer-implemented method for detecting malicious blocks based on detected asymmetric conditional branches, the method comprising:
   receiving, via a hardware processor device, an application to be tested;
   computing, via the hardware processor device, a static call graph for the application;
   generating, via the hardware processor device, an interprocedural control-flow graph (ICFG) based on the static call graph for the application;

detecting, via the hardware processor device, symbolic path conditions and executable operations along different paths of conditional branches in the ICFG;

detecting, via the hardware processor device, asymmetric conditional branches based on the symbolic path conditions and the executable operations, wherein differing amounts of code detected in two or more respective conditional branches indicate an asymmetric conditional branch;

identifying, via the hardware processor device, one or more malicious blocks based on the detected asymmetric conditional branches; and modifying, via the hardware processor device, the application based on the one or more detected malicious blocks.

9. The computer-implemented method of claim 8, further comprising:

generating, via the hardware processor device, a list of potentially malicious blocks based on the detected asymmetric conditional branches;

detecting, via the hardware processor device, a potentially malicious block corresponding to an error handling operation; and removing, via the hardware processor device, the potentially malicious block corresponding to the error handling operation from the list of potentially malicious blocks.

10. The computer-implemented method of claim 8, further comprising displaying detected false positives corresponding to the error handling operations in a user interface prior to being removed.

11. The computer-implemented method of claim 8, wherein the detecting the asymmetric conditional branches further comprises comparing an amount of code in the executable operations corresponding to blocks of each branch of a conditional branch, wherein a differing number of operations detected in the each branch of the one or more respective conditional branches indicates an asymmetric conditional branch.

12. The computer-implemented method of claim 8, wherein the detecting the asymmetric conditional branches further comprises comparing a number of security-relevant operations in each branch of the symbolic path condition.

13. The computer-implemented method of claim 8, wherein the modifying the application further comprises removing a conditional branch associated with the detected malicious block.

14. The computer-implemented method of claim 8, wherein the modifying the application further comprises removing the malicious block from the application.

15. A computer program product for detecting malicious blocks based on detected asymmetries, the computer program product comprising a non-transitory computer-readable storage medium having program code embodied therewith, the program code executable by a processor to cause the processor to:

receive an application to be tested;

compute a static call graph for the application;

generate an interprocedural control-flow graph (ICFG) based on the static call graph;

detect symbolic path conditions and executable operations along different paths of conditional branches in the ICFG;

detect asymmetric conditional branches based on the symbolic path conditions and the executable operations, wherein differing amounts of code detected in two or more respective conditional branches indicate an asymmetric conditional branch;

detect one or more error handling operations associated with one or more of the asymmetric conditional branches;

identify one or more malicious blocks based on the detected asymmetric conditional branches and the one or more error handling operations; and modify the application based on the detected malicious blocks.

16. The computer program product of claim 15, further comprising program code executable by the processor to generate a list of potentially malicious blocks and adding a potentially malicious block to the list of potentially malicious blocks.

17. The computer program product of claim 16, further comprising program code executable by the processor to detect an error handling operation and remove a block from the list of potentially malicious blocks corresponding to the detected error handling operation.

18. The computer program product of claim 15, further comprising program code executable by the processor to compare an amount of code in two blocks corresponding to a symbolic path condition.

19. The computer program product of claim 15, further comprising program code executable by the processor to compare a number of security-relevant operations to be executed under each branch of the symbolic path condition.

20. The computer program product of claim 15, further comprising program code executable by the processor to modify the application by removing the malicious block from the application.

* * * * *